G. & T. WIARD.

PLOW.

No. 7,075. Reissued April 25, 1876.

Charles J. Buckhitt
C. H. Woodward } Witnesses

George Wiard
Thomas Wiard Inventors
By Edward Wilhelm
Attorney.

N. PETERS, PHOTO-LITHOGRAPHER, WASHINGTON, D. C.

UNITED STATES PATENT OFFICE.

GEORGE WIARD AND THOMAS WIARD, OF EAST AVON, NEW YORK, ASSIGNORS TO GEORGE WIARD AND CHARLES W. HOUGH, OF SAME PLACE.

IMPROVEMENT IN PLOWS.

Specification forming part of Letters Patent No. 165,903, dated July 20, 1875; reissue No. 7,075, dated April 25, 1876; application filed April 6, 1876.

*To all whom it may concern:*

Be it known that we, GEORGE WIARD and THOMAS WIARD, both of East Avon, in the county of Livingston and State of New York, have invented certain new and useful Improvements in Plows, which improvements are fully set forth in the following specification, reference being had to the accompanying drawing.

Previous to our invention land-sides have been attached to plow-beams by various means, (such as bolts, grooves and ribs, and offsets on the land-side,) but all of the means heretofore employed for the purpose are more or less objectionable, for the reason that they do not relieve the fastening-bolt from all shearing strains, or divest it of a tendency to bend or wear, and become loose.

The object of the first part of our invention is to remedy this defect; and it relates to the construction of the means by which the land-side is secured to the standard, so as to fully relieve the fastening-bolt from all shearing strains.

The second part of our invention relates to the means for fastening the handle to the mold-board, so as to form a strong and substantial connection, and prevent the splitting of the handle.

The third part of our invention relates to the construction of the upper-handle supports so as to enable the same to be readily cast with the mold-board, without liability of cracking either in casting or when in use.

The fourth part of our invention relates to the peculiar construction of the brace connecting the handles with the plow-beams.

Figure 1:
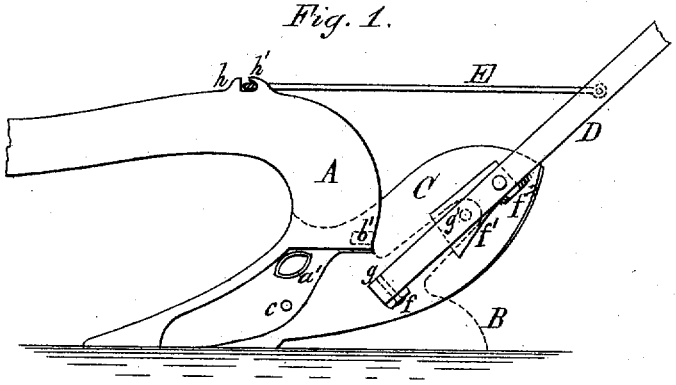
Figure 4:
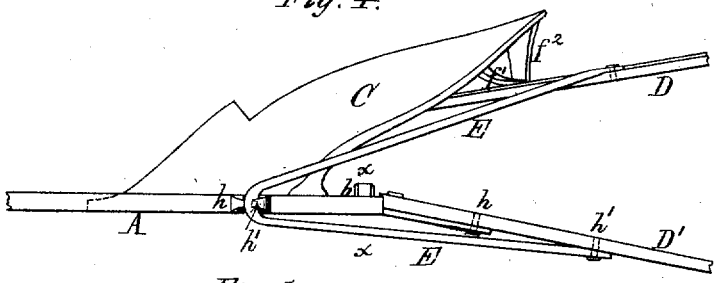
Figure 5:
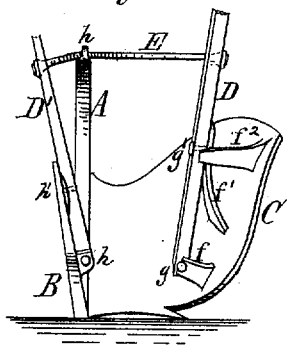
Figure 3:
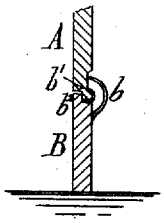
Figure 2:
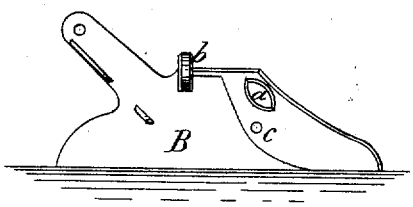

In the accompanying drawing, Figure 1 is a side elevation of a plow provided with our improvements, the land-side being represented by dotted lines. Fig. 2 is a reverse side elevation of the land-side. Fig. 3 is a vertical section. Fig. 4 is a top plan view of the plow. Fig. 5 is a rear elevation of the plow.

Like letters of reference refer to like parts in each of the figures.

A represents a plow-beam made of iron; B, the land-side; C, the mold-board; D, the mold-board handle, and D′ the land-side handle. $a'$ represents an oblong or elliptical recess formed in the lower part of the beam A on its side adjacent to the land-side, and $a$ a projection of corresponding form, arranged on the land-side, so as to fit into the recess $a'$. $b^1$ represents a lug, formed with the beam A at its rear end, engaging back of an offset, $b^2$, formed on the upper edge of the land-side. $b$ is an upwardly-projecting semicircular hook, formed with the land-side, so as to overlap the lug $b^1$ of the beam. $c$ is the ordinary fastening-bolt for securing the land-side to the lower part of the beam. The overlapping semicircular hook $b$ and beam-lug $b^1$ receive all vertical strains, while the projection $a$ and recess $a'$ receive all strains acting in a horizontal or inclined directio , thus relieving the fastening-bolt $c$ of all shearing strains in the plane of the land-side, leaving the bolt exposed only to strains in the direction of its length, or in the line of its greatest resistance, and even these strains are partially received by the semicircular hook $b$ and lug $b^1$.

It will be seen that the above-described devices constitute a most secure and durable means of attaching the land-side to the standard or lower part of the beam, permitting a lighter fastening-bolt to be employed with a greater amount of security than heretofore obtained.

$f\,f^1$ represent two projecting arms, cast on the rear side of the mold-board for supporting the handle D. The arm $f$ receives the lower end of the handle D, and the arm $f^1$ is curved upward, so as to support the handle at a point a little below the upper edge of the mold-board, as clearly shown. $g$ $g'$ represent the fastening-bolt securing the handle D to the supporting-arms $f$ and $f^1$, respectively. The bolt $g'$ passes horizontally through the handle D, and the arm $f^1$ and the bolt $g$ are arranged at right angles to the bolt $g'$, so as to pass, in an upwardly-inclined direction, through the handle, as clearly shown in Figs. 1 and 5. By this peculiar arrangement of the fastening-bolts all tendency of the handle to split under a heavy strain, is avoided, and a more secure and durable connection of the plow-handle obtained. The handle D′ is secured to the land-side in the same manner by two bolts, $h$ and $h'$. $f^2$ is a lateral brace, connecting the outer or rear end of the mold-board with the upper end of the arm $f^1$, it being cast in one piece with the mold-board and arm $f^1$. The brace $f^2$, by supporting the heretofore free end of the arm $f^1$, renders the latter more rigid, thereby enabling the same to be made considerably lighter than heretofore, so that the arm $f^1$, at the point where it connects with the mold-board, can be made sufficiently thin to be readily cast with the mold-board without causing any injurious strains in the casting.

Previous to our invention the arm $f^2$ had to be made so heavy at the base, in order to make it sufficiently strong to hold the handle D, that its thickness was out of proportion with the thickness of the mold-board, thereby frequently causing the mold-board to crack at that point, either in casting or when in use. The brace $f^2$, by enabling the arm $f^1$ to be made lighter, insures sound castings, and also forms a support for the rear end of the mold-board, strenthening the same, and preventing it from being broken by throwing the plow on its side. The end of the brace $f^2$ may project a short distance beyond the face of the arm $f^1$, as shown in Fig. 5, so as to form a ledge, on which the handle D is supported. E represents the brace connecting the two handles D D′ with the beam A. The brace E is formed in one angular piece, flattened at the bent or apex of the angle, so that when held perpendicular it will readily enter a socket, $h$, on the upper side of the beam, and being then swung into a horizontal position toward the handles D D′, the flattened portion of the brace passes under a projecting lip, $h'$, which prevents the upward escape or play of the brace at its bent.

We are aware of Letters Patent granted to E. Wiard, June 23, 1874, No. 152,445, and reissue No. 5,941, June 30, 1874, and do not claim the devices described and shown therein; but

What we claim as our invention is—

1. The combination, with the beam A, provided with a lug, $b^1$, and recess $a'$, of the landside B, constructed with offset $b^2$, semicircular hook $b$, and elliptical lug $a$, and fastening-bolt $c$, substantially as and for the purpose hereinbefore set forth.

2. A plow-handle, secured to two supports, $f$ $f^1$, by two bolts, $g$ $g'$, arranged at right angles to each other, for preventing the splitting of the handle, substantially as and for the purpose hereinbefore set forth.

3. A mold-board cast with the handle-supporting arm $f^1$ and a lateral brace, $f^2$, connecting the upper end of the arm $f^1$ with the rear end of the mold-board, substantially as and for the purpose hereinbefore set forth.

4. The handle-brace E, constructed in one angular piece, flattened at the bent, in combination with a socket, $h$, arranged on the beam A, and having undercut lip $h'$, substantially as and for the purpose hereinbefore set forth.

GEORGE WIARD.
THOMAS WIARD.

Witnesses:
F. RAMSDELL,
ISAAC DIBBLE.